United States Patent [19]

Hayes et al.

[11] Patent Number: 5,358,199
[45] Date of Patent: Oct. 25, 1994

[54] AUTOMATIC FLIGHT CONTROL SYSTEM HAVING UNIFIED GRAPHIC MISTRIM INDICATOR

[75] Inventors: E. Bernard Hayes; Charles W. Case, both of Cedar Rapids, Iowa

[73] Assignee: Rockwell International Corporation, Seal Beach, Calif.

[21] Appl. No.: 947,026

[22] Filed: Sep. 17, 1992

[51] Int. Cl.$^5$ .................................................. G01C 23/00
[52] U.S. Cl. ..................... 244/1 R; 340/973; 340/976; 340/979
[58] Field of Search ............... 244/1 R, 194; 340/973, 340/974, 975, 976, 979; 364/434

[56] References Cited

U.S. PATENT DOCUMENTS

| | | | |
|---|---|---|---|
| 3,521,228 | 7/1970 | Congleton et al. | 340/973 |
| 4,326,189 | 4/1982 | Crane | 340/973 |
| 4,563,742 | 1/1986 | McElreath | 340/975 |
| 4,663,627 | 5/1987 | Dennis | 244/1 R |
| 5,212,480 | 5/1993 | Ferro | 340/973 |

FOREIGN PATENT DOCUMENTS

| | | | |
|---|---|---|---|
| 2654856 | 5/1991 | France | 364/434 |
| 253496 | 11/1991 | Japan | 340/975 |
| 9208107 | 5/1992 | PCT Int'l Appl. | |

*Primary Examiner*—Michael S. Huppert
*Assistant Examiner*—Virna Lissi Ansley
*Attorney, Agent, or Firm*—Gregory G. Williams; M. Lee Murrah; H. Fredrick Hamann

[57] ABSTRACT

An improved flight control system with an enhanced unified graphic mistrim indicator where the flight control computer provides signals to a single mistrim indicator wherein the signals represent the status of the control surfaces of the aircraft and the mistrim indicator displays a single movable reference marker, which is caused to be translated vertically in the event of pitch mistrim, is caused to be rotated right or left in the case of roll mistrim conditions, is caused to be translated right or left in the case of yaw mistrim conditions or is caused to be moved in a combination of ways either translating vertically, horizontally or rotating in order to represent a combination of pitch, roll or yaw mistrim.

20 Claims, 1 Drawing Sheet

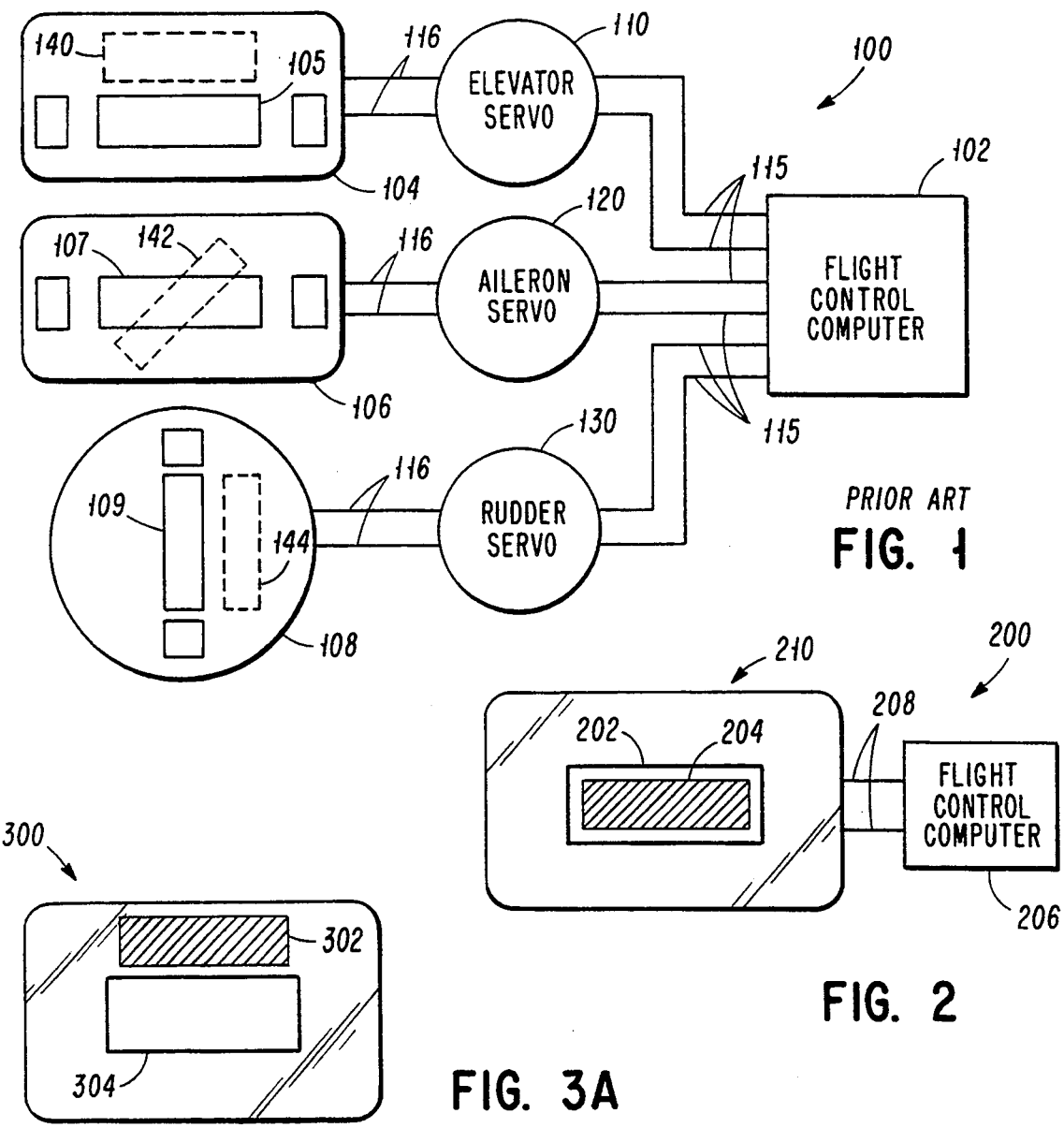
*PRIOR ART*
FIG. 1
FIG. 2
FIG. 3A
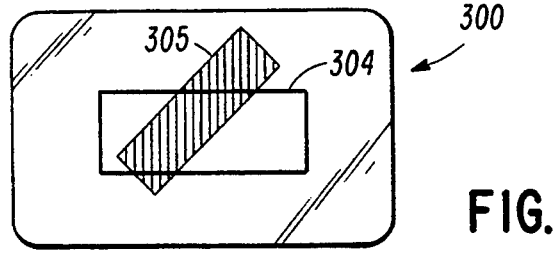
FIG. 3B
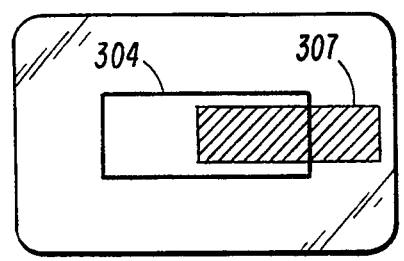
FIG. 3C
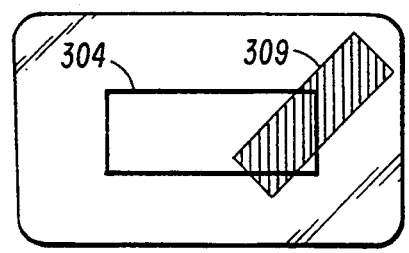
FIG. 3D

AUTOMATIC FLIGHT CONTROL SYSTEM HAVING UNIFIED GRAPHIC MISTRIM INDICATOR

FIELD OF THE INVENTION

The present invention relates to automatic flight control systems, and more particularly concerns automatic flight control systems having mistrim indicators, and even more particularly concerns such systems having a single graphic representation of type, direction and magnitude of autopilot mistrim conditions.

BACKGROUND OF THE INVENTION

In the past, avionics engineers have frequently included individual mistrim indicator dials for the pitch, roll and yaw axes. These indicator dials are typically connected via wires to the elevator, aileron, and rudder servos, respectively. While these indicator dials have gained widespread acceptance in the past, they have several serious drawbacks. First of all, the individual indicator dials require a pilot to look at several individual dials in order to assess the entire trim condition of the aircraft. Secondly, the dial information is displayed in such a way as to create confusion as to whether it indicates the present trim status of the aircraft or commands that the pilot should follow to correct a mistrim condition. Furthermore, the individual dials, with their individual connections to the servo motors, create potential for dangerous electromagnetic interference which might adversely effect the operation of the servo and consequently, the orientation of the critical control services of the aircraft.

Consequently, there exists a need for improvement in automatic flight control systems which provide for quick and easy assessment of mistrim conditions and needed corrective actions and also provide for enhanced reliability.

SUMMARY OF THE INVENTION

It is an object of the present invention to provide an automatic flight control system with enhanced reliability.

It is a feature of the present invention to eliminate the direct connections between the indicator dials and their corresponding servos.

It is an advantage of the present invention to reduce the exposure to electromagnetic interference which might adversely effect the servo operation.

It is another object of the present invention to provide a quick indication of mistrim to the pilot.

It is another feature of the present invention to provide a single indicator which shows mistrim in all three axes.

It is another advantage of the present invention to eliminate the need to refer to three individual dials to ascertain the entire mistrim situation.

It is yet another object of the present invention to provide an easily understood indication of the trim status of the aircraft.

It is yet another feature of the present invention to provide a target rectangle and an aircraft box where the aircraft box is disposed within the target rectangle when the aircraft is properly trimmed.

It is yet another advantage of the present invention to provide an indication that is less likely to be misunderstood by the pilot.

The present invention provides an automatic flight control system which is designed to satisfy the aforementioned needs, produce the earlier propounded objects, include the above described features, and achieve the already articulated advantages. The invention is carried out in a "confusion-less" system, in the sense that the confusion often associated with whether the indicator provides a current status report or pilot commands has been reduced.

Accordingly, the present invention relates to an automatic flight control system which includes a single graphic mistrim indicator which is coupled directly to a flight control computer, so that, a movable marker, representing the aircraft orientation, is variably displayed on the indicator in response to various orientations of the aircraft and further is displayed with respect to a predetermined fixed reference marker.

BRIEF DESCRIPTION OF THE DRAWINGS

FIG. 1 is a block diagram representation of typical flight control system, of the prior art, which shows the individual indicator dials for each axis and shows the direct connections between those dials and their respected servos.

FIG. 2 is a block diagram representation of the automatic flight control system, of the present invention, showing a single mistrim indicator with connections directly to the flight control computer. The indicator shows the plane in trim.

FIG. 3A is a graphic representation of the mistrim indicator, of the present invention, which shows the aircraft with a nose-up mistrim.

FIG. 3B is a graphic representation of the mistrim indicator, of the present invention, which shows the aircraft in a left wing down mistrim condition.

FIG. 3C is a graphic representation of the mistrim indicator, of the present invention, which shows the aircraft in a nose-left mistrim condition.

FIG. 3D is a graphic representation of the mistrim indicator, of the present invention, which shows the aircraft simultaneously in a nose-left mistrim and a left wing down mistrim condition.

DETAILED DESCRIPTION

Now referring to the figures, and more particularly to FIG. 1, there is shown a mistrim indicator system, of the prior art, generally designated 100, having an elevator servo 110, an aileron servo 120 and a rudder servo 130 for manipulating an elevator, aileron and rudder (not shown) respectively, in response to commands from a flight control computer 102. Servos 110, 120, 130 and flight control computer 102 are well known in the art. Additionally, flight control computer 102 is well known to issue commands or signals to the servos 110, 120 and 130, and also monitor the position of the servos and consequently the flight control surfaces. This issuing of commands and monitoring of servos is accomplished through connecting wires 115. Coupled to servos 110, 120 and 130 are pitch mistrim indicator 104, roll mistrim indicator 106 and yaw mistrim indicator 108, respectively. The indicators 104, 106 and 108 are well known in the art and may be comprised of pivoting needle gauges or gauges as depicted in FIG. 1, wherein the pitch mistrim indicator 104 is shown having a box 105, which is caused to move in a translational motion to a position 140 when the aircraft is in a nose-up mistrim. Similarly, the indicator 106 includes a reference bar 107 which is caused to rotate and thereby indicate a roll mistrim. When the reference bar 107 is rotated into the position 142, the aircraft is in a left wing down mistrim condition.

Similarly, the indicator 108 displays the yaw mistrim indication of the aircraft when reference bar 109 is caused to translate right or left to position 144, it indicates a nose-right mistrim.

In operation, the prior art mistrim indicators required the pilot to look at all three indicators, 104, 106 and 108, in order to determine the mistrim status of the aircraft. Furthermore, the mistrim indicator system 100, of the present invention, included wires 116 extending directly from the indicators 104, 106 and 108 to the servos 110, 120 and 130 respectively.

Now referring to FIG. 2, there is shown a mistrim indicator system, generally designated 200, having a flight control computer 206, and a mistrim indicator 210 coupled thereto by wires 208. Mistrim indicator 210 is preferably a video display, such as an LCD, CRT, HUD, or other display means. Mistrim indicator 210 is shown having a fixed rectangular frame 202 disposed centrally in the indicator with a variably placed aircraft indicator 204, which is preferably a scaled-down rectangle of the same general shape as the frame 202 or the like. FIG. 2 shows the mistrim indicator displaying the aircraft reference bar 204 disposed squarely in the center of frame 202; this would represent a trimmed condition for the aircraft (i.e. no mistrim). The flight control computer 206 is well known in the art and is similar to flight control computer 102 in that it issues commands to the elevator, aileron and rudder servos (not shown) and continually monitors their position. The flight control computer 206 uses the information on the position of the servos which correspond to the positions of the control surfaces in its calculations for various functions, including the auto-pilot function. This current status information is also provided to the mistrim indicator 210 via lines 208.

Now referring to FIGS. 3A, 3B, 3C and 3D, there are shown four display screens of the mistrim indicator, of the present invention, which show pitch mistrim, roll mistrim, yaw mistrim and a combination of yaw and roll mistrim.

Now referring to FIG. 3A, there is shown a mistrim indicator, of the present invention, generally designated 300 having a reference frame 304 disposed centrally in the indicator. The aircraft bar 302 is shown disposed above the center of the reference frame 304 which indicates a nose-up mistrim.

Now referring to FIG. 3B, there is shown a mistrim indicator, of the present invention, generally designated 300, with a fixed centrally located reference frame 304 and a movable aircraft reference bar 305 disposed in a skewed fashion therein where the left side of the aircraft reference bar 305 is shown lower than the right side of the aircraft reference bar, which indicates a left wing down roll mistrim condition.

Now referring to FIG. 3C, there is shown a mistrim indicator, of the present invention, generally designated 300 having a centrally disposed fixed reference marker 304 and a movable aircraft reference marker 307 disposed to the right of the center of the fixed reference marker 304. This orientation of marker 307 indicates a nose-left yaw mistrim condition.

Now referring to FIG. 3D, there is shown a mistrim indicator, of the present invention, generally designated 300 having a centrally disposed fixed reference marker 304 and a movable aircraft reference marker 309 disposed in a skewed fashion with respect to the fixed reference marker 304. Marker 309 is representative of a display indicating the aircraft is in both a nose-left yaw mistrim condition and a left wing down roll mistrim indication.

In operation, the present invention provides a simplified and unified graphic representation of the mistrim of an aircraft by monitoring the position of the several servos and consequently, the control surfaces of the aircraft and providing those from the flight control computer 206 along lines 208 to a mistrim indicator 210. The pilot of the aircraft is provided with a simple representation of the mistrim of the aircraft and also is provided with an easy and convenient way to receive instructions from the flight control computer in order to correct the mistrim indication. The pilot is told to fly the reference bar inside the reference frame so that it resembles indicator 210 in FIG. 2. For example, a pilot flying an aircraft with a mistrim indicator, as shown in FIG. 3A, would know that the aircraft would have to have its nose trimmed down in order to move reference bar 302 into reference frame 304, so that it corresponded to the indicator 210. Similarly, a pilot flying an aircraft with a mistrim indicator, as shown in FIG. 3B, would need to trim the left wing up in order to arrive at a representation such as in FIG. 2. Similarly, the corrective response for a mistrim indicator, as shown in FIG. 3C, would be to trim the nose to the right. Finally, a pilot flying an aircraft with a mistrim indicator, as shown in FIG. 3D, would need to both trim the aircraft nose to the right to overcome the yaw mistrim and to trim the left wing up in order to overcome the roll mistrim.

The description herein and the drawings show a rectangular fixed reference frames or markers 202 and 304 and a rectangular movable aircraft reference bar or marker 204 and 302, 305, 307 and 309. It should be understood that other shapes of these reference frames and markers and reference bars and markers could be substituted. Such as the reference frame 202 and the reference bar 204 might be in the shape of an aircraft, a cross, a square, a triangle, an ellipse, or any other shape or configuration where the object is to fly a single movable reference marker into a fixed reference frame.

It is thought that the mistrim indicator system, of the present invention, and many of its attendant advantages will be understood from the foregoing description, and it will be apparent that various changes may be made in the form, construction, and arrangement of the parts thereof without departing from the spirit and scope of the invention, or sacrificing all of their material advantages, the forms herein before described being merely preferred or exemplary embodiments thereof. It is the intention of the appended claims to cover all such changes.

We claim:

1. An improved automatic flight control system having unified graphic mistrim indicator comprising:
   a flight control computer for monitoring the position and status of a plurality of control surface servos;
   a single mistrim indicator, for simultaneously displaying the pitch, roll and yaw mistrim conditions of the aircraft;
   a plurality of connectors, coupling the mistrim indicator and the flight control computer; and,
   said mistrim indicator including a fixed reference frame with a movable reference bar disposed completely within the reference frame when said aircraft is in a proper trimmed configuration and movable outside the reference frame when the aircraft is in any combination of a pitch, roll or yaw mistrim condition.

2. A flight control system comprising:

a rudder servo, for controlling position of an aircraft rudder, in response to a rudder position signal;

an aileron servo, for controlling the position of an aircraft aileron, in response to an aileron position signal;

an elevator servo, for controlling the position of an aircraft elevator, in response to an elevator position signal;

a flight control computer coupled with said rudder servo, said aileron servo, and said elevator servo for generating rudder position signals, aileron position signals, and elevator position signals, which are representative of the position of a rudder, an aileron, and an elevator respectively;

a mistrim indicator, coupled with said flight control computer, for receiving said rudder position signals, aileron position signal, and elevator position signal;

said indicator including a fixed reference marker representative of an aircraft in proper trim and a movable marker, having a central point therein; and, said movable marker representative of the current trim condition of the aircraft and responding to said rudder position signal, aileron position signal, and said elevator position signal, so that, said movable marker is simultaneously caused to move horizontally in response to changes in said rudder position signal, rotate about said central point in response to changes in said aileron position signal, and move vertically in response to said elevator position signal.

3. A flight control system of claim 2, wherein said fixed reference marker is a rectangular frame.

4. A flight control system of claim 3, wherein said movable marker is a rectangular bar, capable of being positioned inside said rectangular frame.

5. A flight control system of claim 2, wherein said fixed reference marker is an outline of two intersecting, perpendicular lines.

6. A flight control system of claim 5, wherein said movable marker is a rectangular cross.

7. A flight control system of claim 2, wherein said fixed reference marker is representative of a shape of a fixed wing aircraft.

8. A flight control system of claim 7, wherein said movable marker is a representation of a shape of a fixed wing aircraft.

9. A flight control system of claim 2, wherein said fixed reference marker is a polygon.

10. A flight control system of claim 9, wherein said movable marker is a second polygon capable of being positioned inside the first polygon.

11. A flight control system of claim 2, wherein said fixed reference marker is elliptical in shape.

12. A flight control system of claim 11, wherein said movable marker is elliptical in shape.

13. A flight control system comprising:

a rudder servo, for controlling position of an aircraft rudder, in response to a rudder position signal;

an aileron servo, for controlling the position of an aircraft aileron, in response to an aileron position signal;

an elevator servo, for controlling the position of an aircraft elevator, in response to an elevator position signal;

a flight control computer coupled with said rudder servo, said aileron servo, and said elevator servo for generating rudder position signals, aileron position signals, and elevator position signals, which are representative of the position of a rudder, an aileron, and an elevator respectively;

a mistrim indicator directly coupled with said flight control computer, for receiving said rudder position signals, aileron position signal, and elevator position signal;

said indicator including a fixed reference marker representative of an aircraft in proper trim and a movable marker, having a central point therein; and, said movable marker representative of the current trim condition of the aircraft and responding to said rudder position signal, aileron position signal, and said elevator position signal, so that, said movable marker is simultaneously caused to move horizontally in response to changes in said rudder position signal, rotate about said central point in response to changes in said aileron position signal, and move vertically in response to said elevator position signal.

14. A flight control system of claim 13, wherein said mistrim indicator comprises a video display.

15. A flight control system of claim 14, wherein said video display is a cathode ray tube.

16. A flight control system of claim 14, wherein said video display is a liquid crystal display.

17. A flight control system of claim 14, wherein said fixed reference marker is a polygon.

18. A flight control system of claim 17, wherein said movable marker is a polygon.

19. A flight control system of claim 14, wherein said fixed reference marker is an ellipse.

20. A flight control system of claim 19, wherein said movable marker is an ellipse.

* * * * *